United States Patent [19]
Euler

[11] 4,128,145
[45] Dec. 5, 1978

[54] COMBINATION FAILSAFE BRAKE AND ONE-WAY CLUTCH

[75] Inventor: John W. Euler, Benton Harbor, Mich.

[73] Assignee: Lambert Brake Corporation, St. Joseph, Mich.

[21] Appl. No.: 829,471

[22] Filed: Aug. 31, 1977

[51] Int. Cl.² ............................................. F16D 67/02
[52] U.S. Cl. .................................. 188/71.2; 188/71.5; 188/170; 192/12 B
[58] Field of Search ................... 188/71.2, 30, 61, 821, 188/825, 170, 715; 192/12 B, 12 BA

[56] References Cited

U.S. PATENT DOCUMENTS

| | | | |
|---|---|---|---|
| 1,870,532 | 8/1932 | Schuetz | 188/71.2 |
| 3,260,331 | 7/1966 | Borman, Jr. | 188/170 X |
| 3,536,230 | 10/1970 | Williams | 188/170 X |
| 3,547,234 | 12/1970 | Cummins et al. | 188/170 |
| 3,726,801 | 4/1973 | Sterner et al. | 192/12 B X |
| 3,863,038 | 1/1975 | Kreitner et al. | 188/72.3 X |
| 3,966,024 | 6/1976 | Baer | 188/71.2 |

Primary Examiner—George E. A. Halvosa
Attorney, Agent, or Firm—Olson, Trexler, Wolters, Bushnell & Fosse, Ltd.

[57] ABSTRACT

A combination fluid power disc brake and one-way clutch unit is offered. An inner shaft is journalled in a stationary housing, and an outer shaft is journalled upon the inner shaft. A one-way clutch between the shafts causes the inner and outer shafts to rotate together as a unit when the inner shaft is rotated in one direction, but permits the inner shaft to rotate independently of the outer shaft when the inner shaft is rotated in the opposite direction. A disc brake assembly operates upon the outer shaft to selectively retard its rotation. The disc brake assembly is of a failsafe design, and permits outer shaft rotation when a positive hydraulic pressure is applied to the unit. If pressure is lost or removed, the brake is activated, and outer shaft rotation is halted.

9 Claims, 2 Drawing Figures

COMBINATION FAILSAFE BRAKE AND ONE-WAY CLUTCH

BACKGROUND OF THE INVENTION

This invention relates generally to hydraulic brakes and clutches, and more particularly concerns a combined hydraulic brake and clutch which is of a failsafe design, and which is offered in a compact, self-contained package.

In power trains for cranes, a hydraulic brake is often provided for controlling the rotation of a shaft involved in lowering and raising loads. One such brake which has met with considerable commercial success is that disclosed and claimed in U.S. Pat. No. 3,863,038 and in U.S. patent application Ser. No. 801,085 filed May 27, 1977. In these installations at present, the brake is actuated so that the brake itself is pressurized and braking action is eliminated while the shaft rotates. When load moving action is terminated, the brake moves to a shaft-engaging position so as to hold the load.

In cranes and hoists, considerable mechanical advantage is provided throughout the entire drive system, and thus a small system output displacement requires a large input displacement. When the brake is located on or near a large crane or hoist cable drum, any time delay in applying the brake, or any slight retrograde or reverse motion at this position may permit the load to drop some distance. In large cranes or hoists, this load may drop two or three feet before upward motion again begins.

When using such a crane in precise work, this initial load drop is unacceptable. For example, when a large crane or hoist is being used for erecting structural steel, it may be necessary to raise a beam and hold it with considerable precision in order to fit the beam to adjacent columns or other members.

It is therefore desirable to offer not only a hydraulic brake in these power trains, but also a device such as a unidirectional clutch to prevent this momentary load drop in applications involving these cranes, hoists and the like.

While such units can be provided separately, their installation may be difficult, for generous room is not often provided for accommodating these power train elements in the crane.

It is accordingly the general object of the invention to provide a combined shaft brake and one-way clutch in a single, compact housing. A related object is to provide such a unit which incorporates a failsafe design.

Another object of the invention is to provide a combination of the brake and one-way clutch unit which permits an output shaft to be rotated without substantial impediment in one direction, while permitting close control of shaft rotation in the opposite direction. More particularly, shaft rotation in this opposite direction can be entirely prohibited or can be permitted to occur at a slow, gradual rate. A related object is to offer this shaft motion control even under great torque loads such as those found in lifting heavy loads by cranes.

A further object is to provide a powerful shaft-holding action in this unit.

Yet another object of the invention is to provide such a unit in which effective braking action can be applied against an output shaft only when that output shaft is rotated in a given direction. When the shaft is rotated in the opposite direction, the rotation occurs without braking action being applied.

Other objects and advantages of the invention will become apparent upon reading the following detailed description and upon reference to the drawings. Throughout the drawings, like reference numerals refer to like parts.

DETAILED DESCRIPTION

Figure 1:
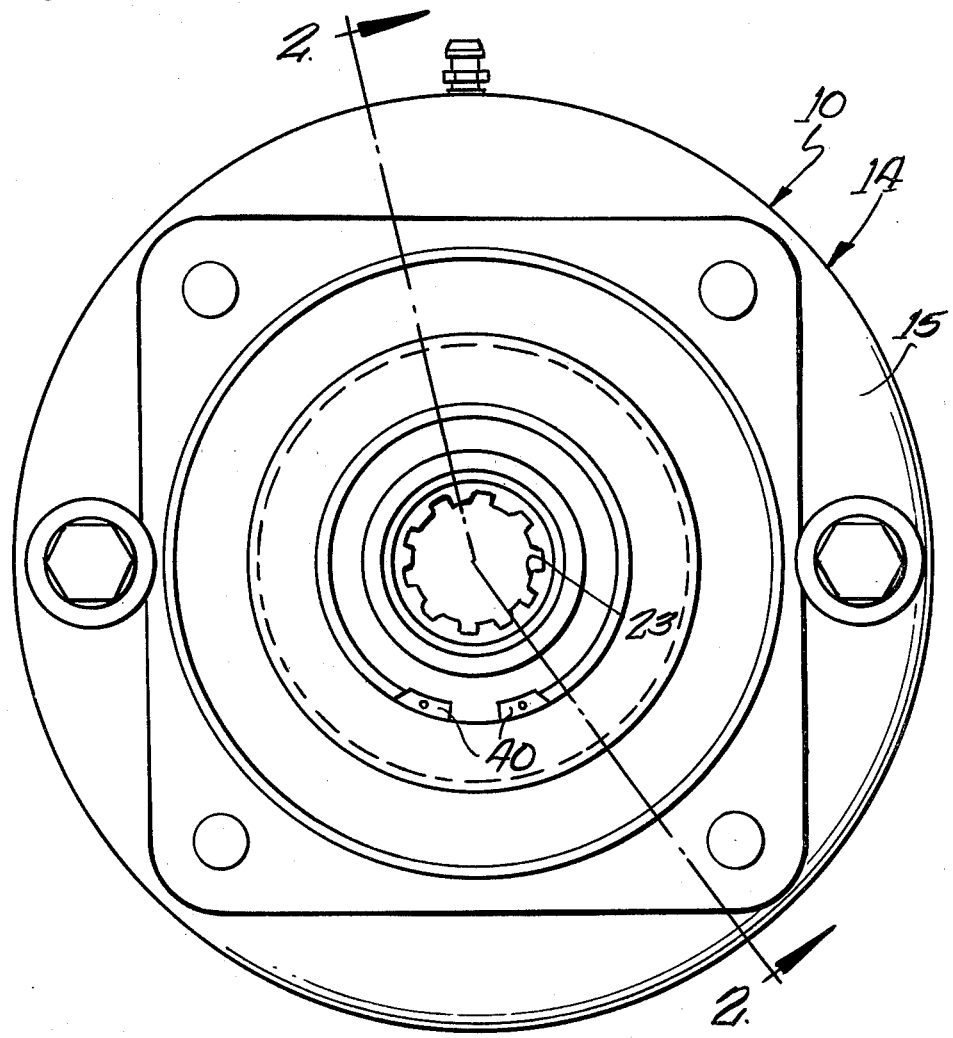
FIG. 1 is an end elevational view of the novel combination brake and one-way clutch.

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning more particularly to the drawings, a combination hydraulic brake and one-way clutch unit 10 is shown interposed between an input unit such as a hydraulic motor 12 and a driven shaft 11 leading to a gear box (not shown). The entire unit is accommodated in a compact housing 14 which here comprises a front or power plate 17 secured, as by bolts (not shown) to a second housing member 15.

To accommodate transfer shafts from adjacent power train units in a compact manner in accordance with one aspect of the invention, the unit 10 is provided with an inner shaft 20 which includes two splined ends 21 and 22. Both these ends 21 and 22 are provided with internal splines 23 to permit adjacent shafts to be slipped axially inside so that the adjacent shafts and the internal shaft 20 will rotate together as a unit. It will be understood that the inner shaft 20 could be modified to provide externally splined shaft ends if such ends would be helpful in connecting the unit 10 to adjacent mechanisms.

In carrying out the invention, it has been found economical to offer the internal shaft 20 as a single hollow unit as shown. This inner shaft 20 can be journalled directly upon the housing 14, as by ball-type or other bearings 26. Here, an inner race 27 of the bearing unit 26 is carried upon the inner shaft 20, and an outer race 28 is affixed to the plate 17 of the housing 14, as by a snap ring 29.

Needle bearings 32 carry an outer shaft 30 upon the inner shaft 20. This outer shaft 30 is provided with splines 34 over at least a portion of its axial length as shown for reasons to be described below.

It is a feature of the invention that the inner shaft 20 and outer shaft 30 rotate together as a unit with no relative motion between them when they rotate in one direction, but the inner shaft 20 is free to rotate independently of the outer shaft 30 when it is turned in an opposite direction. To this end, a one-way clutch member 40 is interposed between a radially extended male collar 41 formed on the inner shaft 20 and a mating, radially extended but axially aligned collar 43 formed on the outer shaft 30. This one-way clutch can be a double cage, full phasing sprag clutch. One such clutch is manufactured by the Borg-Warner Corporation, Spring Division, Bellwood, Illinois. Other sprag clutch units offered by other manufacturers can be utilized with but minimal if any modification to the unit 10.

In further accordance with the invention, a powerful clutching action is available in this unit. Since the collars 41 and 43 are of radially expanded extent, a clutch 40 of correspondingly radially expanded extent can be provided. Such an enlarged clutch can be a clutch unit having a maximum number of sprags, and this relatively large clutch can impose a powerful clutching, rotation-inhibiting force between the shafts 20 and 30 without clutch breakage or shaft damage.

Figure 2:
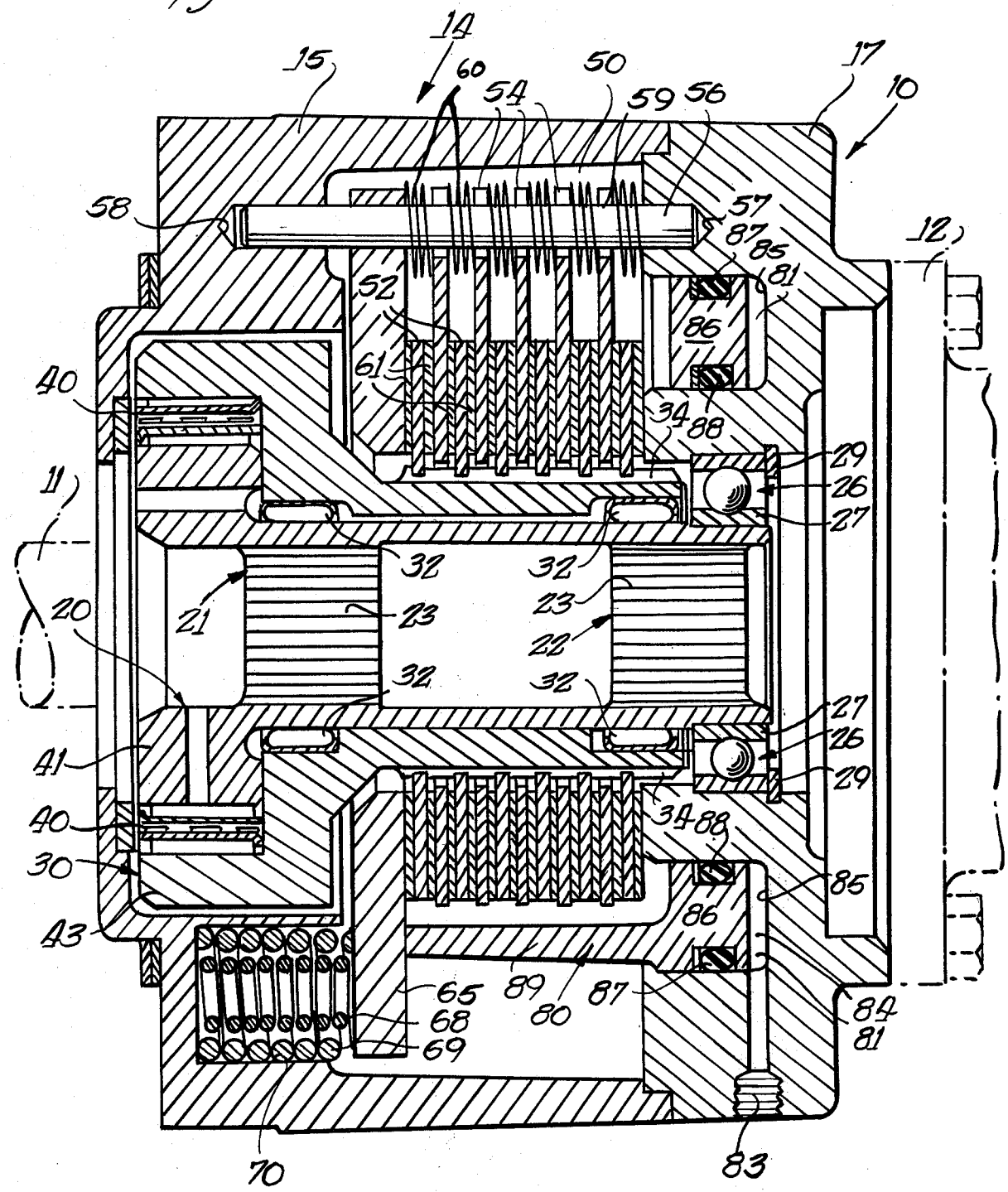
FIG. 2 is a sectional view of the unit taken substantially in the planes of lines 2—2 in FIG. 1.

In carrying out the invention, braking action is applied to the outer shaft 30, and to the inner shaft 20 when it is torqued in a direction causing the sprag clutch 40 to operate the two shafts as a unit. To this end, a brake assembly 50 is provided which radially overlaps the clutch unit 40, but which is axially spaced therefrom as more particularly shown in FIG. 2. To provide the braking action, a plurality of brake rotors 52 are carried on the outer shaft splines 34. By this interconnection, these rotors 52 are mounted so as to turn with the outer shaft 30, but they are free to slide axially either left or right along the shaft 30 as illustrated in FIG. 2.

Interleaved between the rotor discs 52 are stator discs 54. These discs are carried or hung within the housing 14 for axial motion relative to the shafts 30 and 40, but are prevented from rotation therewith. To this end, a plurality of torque pins 56 are mounted in bores 57 and 58 in angularly spaced array about the shafts 30 and 40 in the housing 14. Apertures 59 in the discs 54 permit the discs 54 to slide along the pins 56 over a limited range of motion in an axial direction. Small spacer springs 60 or other biasing devices can also be mounted on the torque pins 56 between the stator discs 54 to encourage stator disc loosening action and proper rotor-stator disc spacing when the rotor discs 52 are turning. To provide long brake life and sensitive braking action, these rotor discs 52 or stator discs 54 can be provided with axially extending brake pads 61.

In accordance with yet another feature of the invention, this unit embodies a brake failsafe design. To this end, a primary stator disc 65 is also hung upon the torque pins 56, and it radially extends so as to be engaged by internested biasing devices 68 and 69 carried in angularly arrayed appropriate wells 70. The springs 68 and 69 engage the primary stator discs 65, and normally urge it to the right as shown in FIG. 2. When the primary stator disc 65 is so engaged and urged to the right, a braking action is applied against the immediately adjacent rotor discs 52, and this disc, too, is urged to the right to engage the adjacent stator disc 54. Thus, all the stator discs 54 and 65 are urged into stacked engagement with the adjacent and interleaved rotor discs 52, and a powerful yet sensitive braking action is applied to the rotor discs 52, and (through the spline connection 34) to the outer shaft 30.

To release the braking action, an annular piston member 80 is carried in an appropriate annular well 81 formed in one member 17 of the housing 14. When braking action release is desired, hydraulic or other fluid is forced through a hydraulic inlet 83 and into the chamber 84 formed between the well bottom 85 and the piston head 86. O-rings 87 and 88 prevent leakage of the fluid from the chamber 81 past the piston head 86.

As increasing amounts of fluid are forced into the chamber 81, the piston head 86 is forced to the left as seen in FIG. 2. An integrally formed annular depending piston skirt 89 is thus also forced to the left. This axially elongated skirt 89 engages the primary stator discs 65, and consequently urges that stator disc 65 to the left, as well, against the action of the springs 68 and 69. Thus, braking pressure applied by the primary stator disc 65 is relieved from the adjacent rotor disc 52 and, consequently, from all the interleaved secondary stator discs 54 and adjacent interleaved rotor discs 52. In summary, as hydraulic fluid is forced into the brake unit 10, braking action is decreased, and the shaft 30 is permitted to rotate free of any braking action.

In operation, an hydraulic motor 12 drives the output shaft 11 through the mechanism in the brake and clutch unit housing 14. When the hydraulic motor 12 offers driving action in one direction, the one-way clutch 40 permits free rotation of the connected inner shaft 20 regardless of braking action applied to the outer shaft 30. Thus, for example, the load applied to the shaft 11 can be rapidly driven in a load-raising direction against little if any friction imposed by the brake and clutch unit. When, however, the hydraulic motor 12 ceases its rotation or begins rotation in the opposite direction, the sprag clutch 40 instantly locks the inner shaft 20 to the outer shaft 30, thereby causing the inner and outer shafts to rotate as a unit. Braking action, however, can be applied against this outer shaft 30 and, indeed, can be applied before the inner shaft 20 halts its rotation or begins reverse rotation so as to instantly actuate the sprag clutch 40, thereby minimizing unit response time. As the hydraulic motor 12 continues its rotation in this opposite direction, as for example in a load lowering direction, the output shaft movement can be precisely and carefully controlled or halted at any desired time by appropriate braking action applied through the biasing springs 68 and 69 and selectively opposed by the hydraulic piston 80. In this way, a load can be rapidly raised, precisely positioned, and carefully and slowly lowered when this novel unit is used with a hoist or similar device.

The invention is claimed as follows:

1. A fluid power brake and clutch unit comprising, in combination, a stationary housing, an inner shaft having a collared portion axially and radially extending from an uncollared portion, both positions being rotatable within said housing, an outer shaft having a collared portion axially and radially extending from an uncollared portion telescopically journalled upon and rotatable independently of the respective collared and uncollared portions of the inner shaft, the inner shaft collared portion having an outer diameter larger than the outer diameter of the outer shaft uncollared portion, disc brake means carried in the housing and connected to the outer shaft uncollared portion to retard rotation of the outer shaft, and one-way clutch means operatively interposed between the inner shaft collar and the outer shaft collar to cause the inner and outer shafts to rotate together as a unit when the inner shaft is rotated in one direction, but permitting the inner shaft to rotate independently of the outer shaft when the inner shaft is rotated in the opposite direction, the one-way clutch means thereby providing powerful braking and clutching action in a compact device.

2. A unit according to claim 1 wherein said disc brake means includes at least one rotor disc carried on the outer shaft for rotation therewith and being adapted for axial sliding motion on the outer shaft, at least one stator disc located adjacent the rotor disc and connected to the housing for axial, non-rotational movement relative to the outer shaft, biasing means in said housing for urging the stator disc into braking engagement with the rotor disc, and selectively actuatable means engaging the stator disc to apply a force urging the stator disc in a direction opposite to the force applied by the biasing means to release the rotor-stator braking action.

3. A unit according to claim 1 wherein said sprag clutch has a minimum internal diameter substantially larger than the outer diameter of the uncollared portion of the inner shaft.

4. A one-way brake and clutch unit comprising a stationary housing, a rotor shaft means rotatable in said housing, and including an inner shaft and an outer shaft journalled upon the inner shaft in telescoping relation, the inner shaft and the outer shaft each having a collared portion extending radially from uncollared respective shaft portions, the outer collared shaft portion also being telescopically carried over the collared inner shaft portion and axially aligned therewith, a plurality of rotor discs carried on the outer shaft for rotation therewith and being adapted for axial sliding motion movement on the outer shaft, a plurality of stator discs interleaved between the rotor discs and including a primary stator disc, the stator disc being connected to the housing for axial, non-rotational movement relative to the rotor shaft means, biasing means in said housing for urging the primary stator disc into braking engagement with the adjacent rotor disc, a selectively actuatable skirt piston extending axially over and surrounding the rotor discs and all the stator discs except the primary stator disc and, when energized, engaging the primary stator disc so as to apply a force urging the primary stator disc in a direction opposite to the force applied by the biasing means to release the rotor-stator braking action, and one-way clutch means functionally interposed between the collared shaft portions to permit inner shaft rotation in one direction, but to inhibit inner shaft rotation in the opposite direction, thereby providing powerful braking and clutching action in a compact device.

5. A unit according to claim 4 including spline connecting means in one end of said inner shaft for torque-transferring connection to an adjacent power train unit.

6. A unit according to claim 5 including spline connecting means at both ends of said inner shaft.

7. A unit according to claim 4 including torque pins carried by said housing and attached to the peripheries of said stator discs to prevent rotation of said stator discs in the housing but permitting axial sliding movement therein.

8. A unit according to claim 4 wherein said one-way clutch means is a sprag clutch.

9. A unit according to claim 8 wherein said sprag clutch is a double cage, full phasing sprag clutch.

* * * * *